United States Patent
Hironaka

(10) Patent No.: US 12,429,385 B2
(45) Date of Patent: Sep. 30, 2025

(54) TEMPERATURE SENSOR

(71) Applicant: DENSO CORPORATION, Kariya (JP)

(72) Inventor: Masaki Hironaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 789 days.

(21) Appl. No.: 17/713,659

(22) Filed: Apr. 5, 2022

(65) Prior Publication Data

US 2022/0228926 A1  Jul. 21, 2022

Related U.S. Application Data

(63) Continuation of application No. PCT/JP2020/034479, filed on Sep. 11, 2020.

(30) Foreign Application Priority Data

Oct. 9, 2019  (JP) .................... 2019-186124

(51) Int. Cl.
| | |
|---|---|
| *G01K 1/14* | (2021.01) |
| *G01K 1/16* | (2006.01) |
| *G01K 7/22* | (2006.01) |
| *G01K 13/024* | (2021.01) |

(52) U.S. Cl.
CPC .............. *G01K 1/14* (2013.01); *G01K 1/16* (2013.01); *G01K 7/22* (2013.01); *G01K 13/024* (2021.01)

(58) Field of Classification Search
None
See application file for complete search history.

(56) References Cited

U.S. PATENT DOCUMENTS

| | | | | |
|---|---|---|---|---|
| 6,157,289 A | * | 12/2000 | Kojima ................. | H01C 7/021 338/331 |
| 6,588,268 B1 | * | 7/2003 | Yamagishi ............. | G01F 1/699 73/204.26 |
| 2009/0302697 A1 | * | 12/2009 | Murakami ............ | F16C 17/107 310/90 |
| 2012/0026659 A1 | | 2/2012 | Kim et al. | |
| 2013/0077653 A1 | * | 3/2013 | Koshimizu ............. | G01K 7/22 374/185 |

(Continued)

FOREIGN PATENT DOCUMENTS

| | | |
|---|---|---|
| JP | 7-140013 | 6/1995 |
| JP | 2012-47306 | 3/2012 |

(Continued)

*Primary Examiner* — Erica S Lin
(74) *Attorney, Agent, or Firm* — Nixon & Vanderhye P.C.

(57) ABSTRACT

A temperature sensor is utilized in a hydrogen tank. The temperature sensor is provided with a temperature sensing element, a pair of element electrode wire, a pair of conduction members and a housing. The temperature sensing element detects the temperature in the hydrogen tank. The pair of element electrode wires are electrically connected to the temperature sensing element. The pair of conduction members are electrically connected to mutually different element electrode wires. The housing is made of resin, that is, a material containing resin. The housing includes a pair of through holes in which the pair of conduction members are each inserted therethrough and supported thereby. A gap is formed between at least one of conduction members and an inner peripheral surface of the through hole of the housing.

8 Claims, 13 Drawing Sheets

(56) References Cited

U.S. PATENT DOCUMENTS

| | | |
|---|---|---|
| 2016/0025576 A1 | 1/2016 | Sato et al. |
| 2016/0033337 A1 | 2/2016 | Sato et al. |
| 2018/0073936 A1 | 3/2018 | Ozeki et al. |

FOREIGN PATENT DOCUMENTS

| | | |
|---|---|---|
| JP | 2014-226862 | 12/2014 |
| JP | 2016-90050 | 5/2016 |
| JP | 2016-133317 | 7/2016 |
| JP | 2017-226817 | 12/2017 |
| JP | 2018-126960 | 8/2018 |

\* cited by examiner

TEMPERATURE SENSOR

CROSS-REFERENCE OF RELATED APPLICATION

This application is the U.S. bypass application of International Application No. PCT/JP2020/034479 filed on Sep. 11, 2020, which designated the U.S. and claims priority to Japanese Application No. 2019-186124 filed on Oct. 9, 2019, the contents of these are incorporated herein by reference.

BACKGROUND

Technical Field

The present disclosure relates to a temperature sensor.

Description of the Related Art

A temperature sensor is known. For example, a temperature sensor is provided with a temperature sensing element for sensing the temperature, an element electrode wiring made of noble metal such as platinum electrically connected to the temperature sensing element, a conduction member electrically connected to the element electrode wire and a housing made of resin which supports these components.

SUMMARY

The present disclosure provides a temperature sensor capable of suppressing occurrence of blister fracture in the housing.

One aspect of the present disclosure is a temperature sensor provided in a hydrogen tank including a temperature sensing element that detects a temperature; a pair of element electrode wires electrically connected to the temperature sensing element; a pair of conduction members electrically connected to mutually different element electrode wires; and a housing made of resin, having a pair of through holes in which the pair of conduction members are each inserted therethrough and supported thereby, in which a gap is formed between at least one of the conduction members and an inner peripheral surface of the through hole.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

A temperature sensor disclosed in the patent literature JP-2016-133317 is provided with a temperature sensing element for sensing temperature, an element electrode wiring made of noble metal such as platinum electrically connected to the temperature sensing element, a conduction member electrically connected to the element electrode wire and a housing made of resin which supports these components. Since the housing is made of resin, the weight of the temperature sensor can be reduced and cost reduction thereof can be accomplished.

For example, the temperature sensor may be provided in a hydrogen tank of a fuel cell vehicle to detect the temperature inside the hydrogen tank. The filling speed of hydrogen into the hydrogen tank is controlled in accordance with the detection result of the temperature inside the hydrogen tank by the temperature sensor. However, in the case where the temperature sensor disclosed by the patent literature 1 is provided in the hydrogen tank, the following problem arises.

When filling hydrogen into the hydrogen tank, the pressure inside the hydrogen tank becomes higher. Accompanying an increase in the pressure inside the hydrogen tank, a hydrogen quantity dissolved in the resin-made housing of the temperature sensor disposed in the hydrogen tank will be increased.

Here, when consuming the hydrogen in the hydrogen tank during travelling of the fuel cell vehicle, the hydrogen quantity in the hydrogen tank decreases such that the pressure in the hydrogen tank is reduced. This reduction of pressure causes a pressure difference between inside and outside of the housing, and the dissolved hydrogen in the housing tends be emitted from the surface of the housing. However, hydrogen that has reached a portion far from the housing surface (e.g. in the vicinity of a pair of conduction members) in the case where the hydrogen tank is in high pressure state, is unlikely be emitted from the housing when reducing the pressure of the hydrogen tank, and expands inside the housing. This may produce air bubbles and cracks caused by the air bubbles in the housing. This phenomenon is referred to as blister fracture.

The cracks produced due to blister fracture may be formed from the surface of the housing communicating through the pair of conduction members. If cracks are formed in this manner, electrical insulation between the pair of conduction members may be degraded. Also, moisture as impurities may enter inside the hydrogen tank, and cause an electrical short between the pair of conduction members if moisture enters into a crack.

Hereinafter, with reference to the drawings, embodiments of the present disclosure will be described.

First Embodiment

With reference to FIGS. 1 to 6, embodiments of a temperature sensor will be described.

The temperature sensor 1 is disposed in a hydrogen tank for use.

Figure 1:
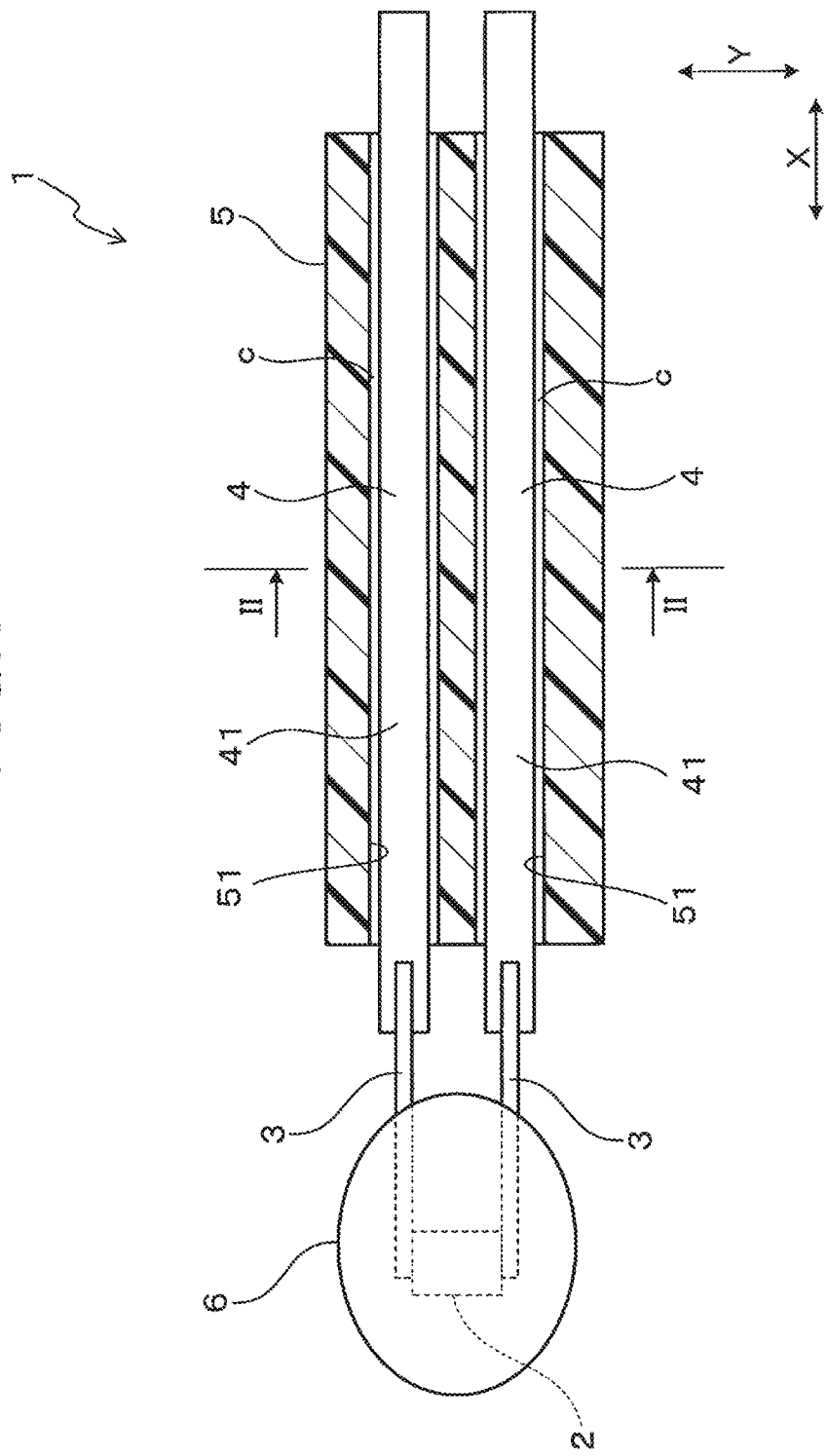
FIG. 1 is a front-view diagram showing a cross-section of a part of a temperature sensor according to a first embodiment.
Figure 2:
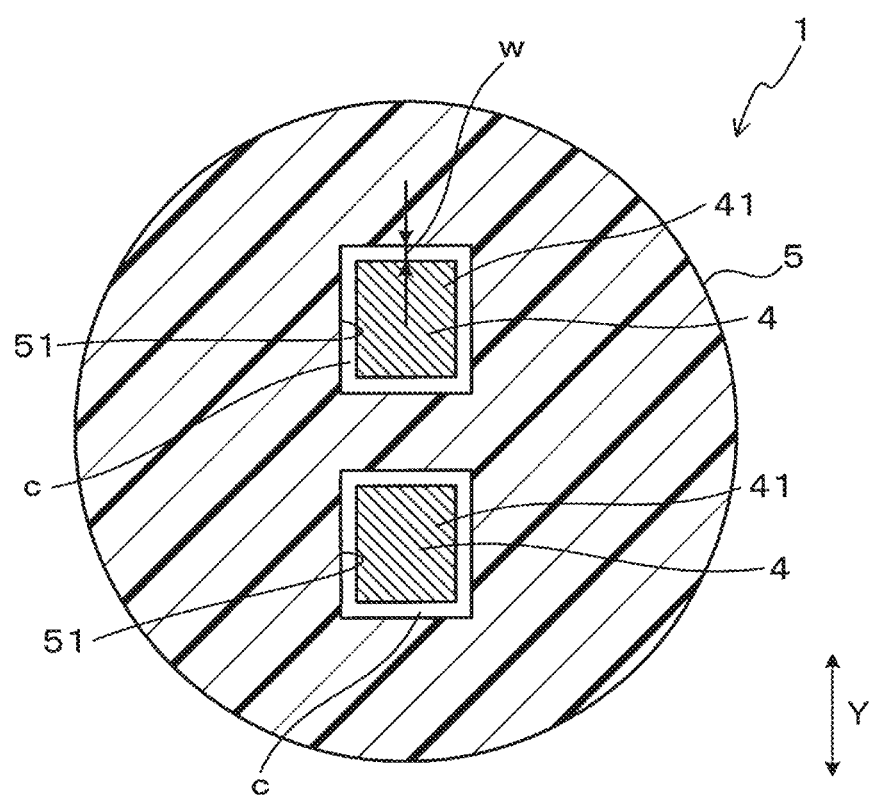
FIG. 2 is a diagram showing a cross-sectional view of FIG. 1 sectioned along a line II-II.

As shown in FIG. 1, the temperature sensor 1 is provided with a temperature sensing element 2, a pair of element electrode wires 3, a pair of conduction members 4 and a housing 5. The temperature sensing element 2 detects a temperature in the hydrogen tank. The pair of element electrode wires 3 are electrically connected to the temperature sensing element 2. The pair of conduction members 4 are electrically connected to mutually different element electrode wires 3. The housing 5 is made of resin, that is, made of material containing resin. The housing 5 includes a pair of through holes 51 in which the pair of conduction members 4 are each inserted therethrough and supported thereby. As shown in FIGS. 1 and 2, a gap c is formed between each conduction member 4 and an inner peripheral surface of the through hole 51. Note that, the gap c is shown larger for the sake of convenience. Hereinafter, the present embodiment will be described in detail.

Hereinafter, a direction where the center axis of the temperature sensor 1 extends is referred to as the X direction. Moreover, as one side in the X direction, a side in which the temperature sensing element 2 is connected on the pair of element electrode wires 3 is referred to as a tip end side and the opposite side thereof is referred to as a base end side. Further, as a direction orthogonal to the X direction, a direction where the pair of conduction members 4 are arranged is referred to as a the Y direction.

The temperature sensor 1 according to the present embodiment is attached to a hydrogen tank used for, for example, a fuel cell vehicle (so called FCV). The filling speed of the hydrogen into the hydrogen tank is controlled in accordance with a detection result of a temperature inside the hydrogen tank detected by the temperature sensor 1. Since a stress occurs inside the hydrogen tank accompanying the hydrogen filling, the temperature sensor 1 is designed to have a sufficient strength against the stress.

Also, pressure inside the hydrogen tank becomes high when filling the hydrogen. In the case where the pressure inside the hydrogen tank is high, the hydrogen gas in the hydrogen gas is dissolved in the housing 5 of the temperature sensor 1. When hydrogen in the hydrogen tank is consumed to produce motion of the fuel cell vehicle, an amount of hydrogen decreases such that the pressure inside the hydrogen tank is reduced. With this reduced pressure, the hydrogen dissolved in the housing 5 tends to be discharged outside the housing 5 through the inside of the housing 5. However, a part of the hydrogen dissolved in the housing 5 may not be discharged from the housing 5, but expand inside the housing 5, and may cause air bubbles in the housing 5 and cracks caused by the air bubbles as an origin. The temperature sensor 1 according to the present embodiment is produced to be capable of suppressing occurrence of cracks.

The temperature sensing element 2 of the temperature sensor 1 is constituted of a thermistor, for example. However, it is not limited thereto. The temperature sensing element 2 may be constituted of a thermocouple or a temperature measuring resistor made of platinum and the like. The temperature sensing element 2 is fixed between tip ends of the pair of element electrode wires 3.

As shown in FIG. 1, a pair of element electrode wires 3 are arranged in the Y direction. The pair of element electrode wires are configured by forming a platinum alloy, for example. The tip ends of the pair of element electrode wires 3 and the temperature sensing element 2 are sealed inside a sealing body 6.

As shown in FIG. 1, the sealing body 6 isolates the temperature sensing element 2 from hydrogen in the hydrogen tank. The sealing body 6 is made of glass material having insulation properties, for example. Note that the sealing body 6 is not limited thereto, but may be constituted of a resin similar to the material of the housing 5 which will be described later. The respective base ends of the pair of element electrode wires 3 are connected to respective tip ends of mutually different conduction members 4.

As shown in FIG. 1, the pair of conduction members 4 are arranged to be mutually substantially parallel. The conduction member 4 is formed to be straight in the X direction. As shown in FIG. 2, the conduction members 4 are formed such that the cross-sectional shape sectioned in a direction orthogonal to the X direction is rectangular. However, it is not limited thereto. For the conduction members 4, various shapes such as a round bar shape in which the cross-sectional shape is a circle or a polygonal prism in which the cross-sectional shape is a polygon may be employed. The conduction members 4 may be constituted of conductive material such as SUS304, for example. As shown in FIGS. 1 and 2, the conduction members 4 are supported by the housing 5.

As shown in FIG. 1, the housing 5 is formed longitudinally in the X direction. The housing 5 is made of resin containing polyamide resin such as PA66 resin or a resin containing polyphenylene sulfide resin (i.e. PPS resin). The housing 5 serves as a portion attached to the hydrogen tank, for example.

As shown in FIG. 1, the housing 5 includes the pair of through holes 51 formed penetrating in the X direction. The through holes 51 are formed longitudinally in the X direction. In each of the pair of through holes 51, each of mutually different conduction members 4 is provided. The conduction members 4 are provided in the through holes 51 such that the tip ends and the base ends thereof protrude from the through holes 51.

As shown in FIGS. 1 and 2, a gap c is formed between the conduction member 4 and an inner peripheral surface of the through hole 51. In a portion between each of the pair of conduction members 4 and the inner peripheral surface of the through hole 51 in which the conduction member 4 is provided, the gap c is continuously formed through a length corresponding to a half of the entire length of the through hole 51 in the X direction. Further, in a portion between at least one of conduction members 4 and an inner peripheral surface of the through hole 51 of the housing 5, the gap c is continuously formed from at least one end of the through hole 51. According to the present embodiment, each of a pair of gaps c formed between each of the pair of conduction members 4 and the inner peripheral surface of the through hole 51 is continuously formed from one end of the through hole 51 to the other end thereof in the X direction. That is, both sides of the gap c in the X direction are opened.

As shown in FIG. 2, the gap c is formed through the entire circumference of the conduction member 4. The gap c has a portion where a dimension w in a direction orthogonal to the surface of the conduction member 4 is larger than or equal to 100 nm. In other words, for a part or whole of the gap c, the dimension w in the normal direction of the surface of the conduction member 4 which faces that portion is larger than or equal to 100 nm.

Figure 3:
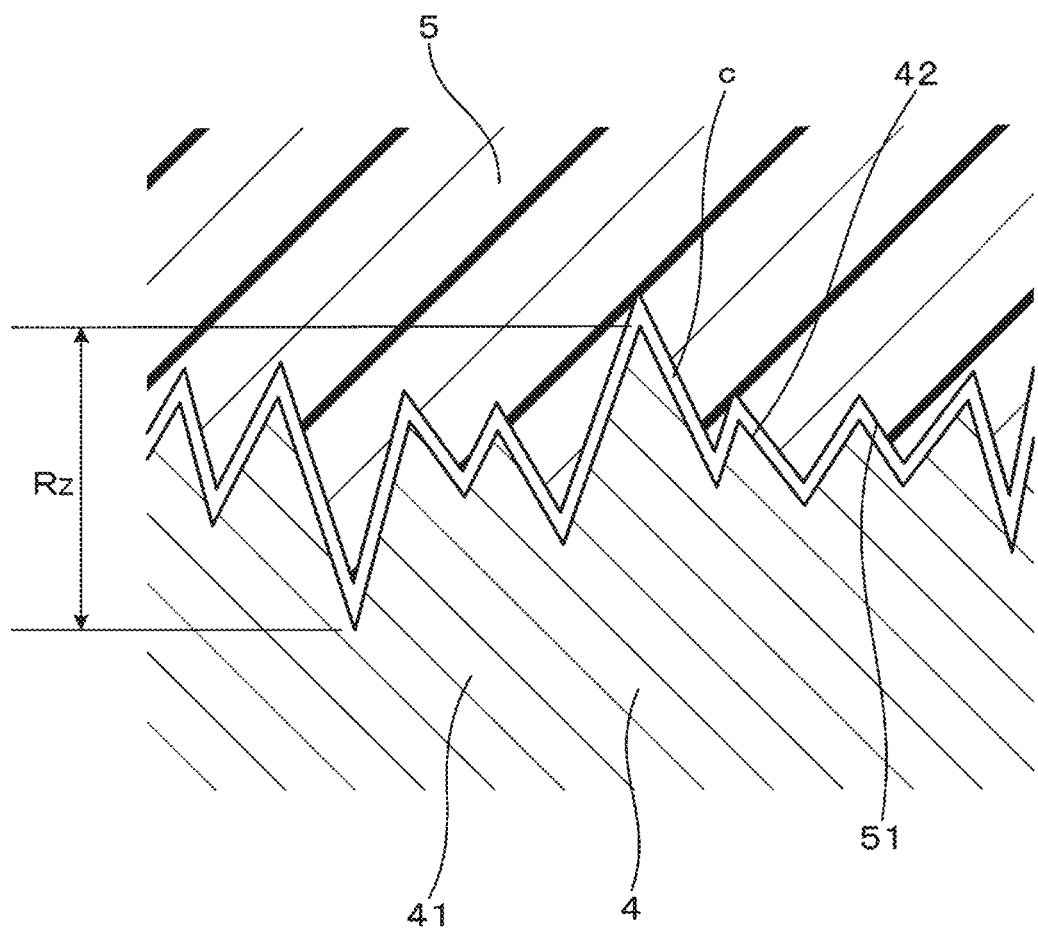
FIG. 3 is a schematic cross-sectional view microscopically showing a surface of a conduction member and a surface of a housing according to the first embodiment.

As schematically shown in FIG. 3, a surface roughness Rz of the surface of an in-hole conduction portion 41 as a portion of the conduction member 4 provided in the through hole 51 of the housing 5 is 30 μm or less. Specifically, the surface roughness of the conduction member 4 at at least a portion facing the inner peripheral surface of the through hole 51 of the housing 5 is 30 μm or less.

As shown in FIG. 3, fine roughness 42 is formed on the surface of the conduction member 4. Generally, the surface of a metal material cannot be formed in a perfect surface shape, but fine roughness is present on the surface when viewed microscopically. According to the present embodiment, the housing 5 is molded by insert molding in which the conduction member 4 is disposed in the mold. Hence, a part of the housing 5 touches the roughness 42 of the conduction member 4 and formed in a shape along the roughness 42. Thus, the inner peripheral surface of the through hole 51 of the housing 5 and the roughness 42 of the surface of the conduction member 4 are engaged such that the conduction member 4 is prevented from disengaging from the housing 5.

Next, an example of a manufacturing method of the housing 5 according to the present embodiment will be described. The gap c between the inner peripheral surface of the through hole 51 of the housing 5 and the conduction member 4 can be formed with devising the manufacturing method of the housing 5.

For the housing 5, a pair of conduction members 4 are arranged at predetermined intervals in a plurality of molds used for molding the housing 5, and insert molding is performed in which resin that constitutes the housing is injected into the mold, thereby forming the housing 5. According to the present embodiment, in the insert molding, heating is performed for setting each molding temperature to be higher than the normal temperature. Then, a resin that constitutes the housing 5 is filled into the mold in which the conduction member 4 is disposed, and the pressure is maintained. Thereafter, only a part of mold that touches the conduction member 4 is positively cooled. Thus, the conduction member 4 is positively cooled so that the conduction member 4 can be significantly contracted, before the resin that constitutes the housing 5 is cured and contracts. Thus, the gap c is formed between the conduction member 4 and the housing 5. Hence, the method of the insert molding is devised, thereby positively forming the gap c between the conduction member 4 and the inner peripheral surface of the through hole 51.

Next, an example method for confirming whether the gap c is present between the inner peripheral surface of the through hole 51 of the housing 5 and the conduction member 4 using the finished good of the temperature sensor 1 will be described.

For example, presence of the gap c can be detected by a leak test using He (i.e. helium) having the atomic radius smallest next to hydrogen. In the leak test, a molding configured of the housing 5 without a gap c and the conduction member 4 is prepared. In the molding, He is fed to the molding from one side of a portion in the X direction between the housing 5 and the conduction member 4. Then, a reference leak quantity is detected. The reference leak quantity is a quantity of He leaked from the other side of the portion in the X direction between the housing 5 and the conduction member 4 in the molding.

Next, similar to the case of the above-described molding, He is fed to a portion between the housing 5 and the conduction member 4 in the temperature sensor 1 which is an object for detecting whether the gap c is present and then, the leak quantity is detected. When the leak quantity is larger than the reference leak quantity by a predetermined value or more, it can be determined that the gap c is formed between the housing 5 and the conduction member 4.

As another methods, a transmission electron microscope (i.e. TEM) is used to directly observe the gap c, or a scanning electron microscope (i.e. SEM) can be used to directly observe the cross-section thereof.

Next, effects and advantages according to the present embodiment will be described. According to the temperature sensor 1, a gap c is formed between at least one conduction member 4 and the inner peripheral surface of the through hole 51 of the housing 5. Hence, hydrogen dissolved in the housing 5 when the hydrogen tank where the temperature sensor is disposed is at high pressure is discharged outside the housing 5 through the housing 5 accompanying with a pressure reduction in the hydrogen tank. Further, the hydrogen is discharged to the gap c through the housing 5. In the housing 5, hydrogen moves in the polymer chains of the resin while colliding with the polymer chains. However, hydrogen can move faster in the gap c since no substance which disturbs the movement of the hydrogen is present. Hence, hydrogen dissolved in the housing 5 when the hydrogen tank is at high pressure is likely to be discharged from inside the housing 5 when the pressure in the hydrogen tank is reduced. Thus, occurrence of blister fracture can be avoided in the housing 5.

Figure 5:
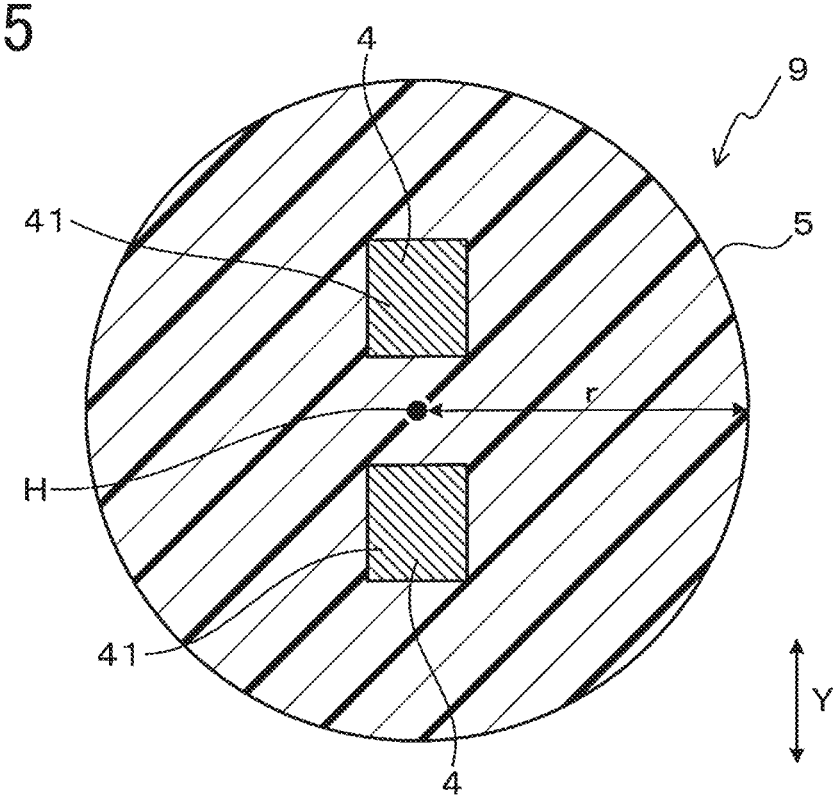
FIG. 5 is a cross-sectional view showing a distance from hydrogen, that has entered a center portion of the housing, to outside the housing according to a comparative example.
Figure 6:
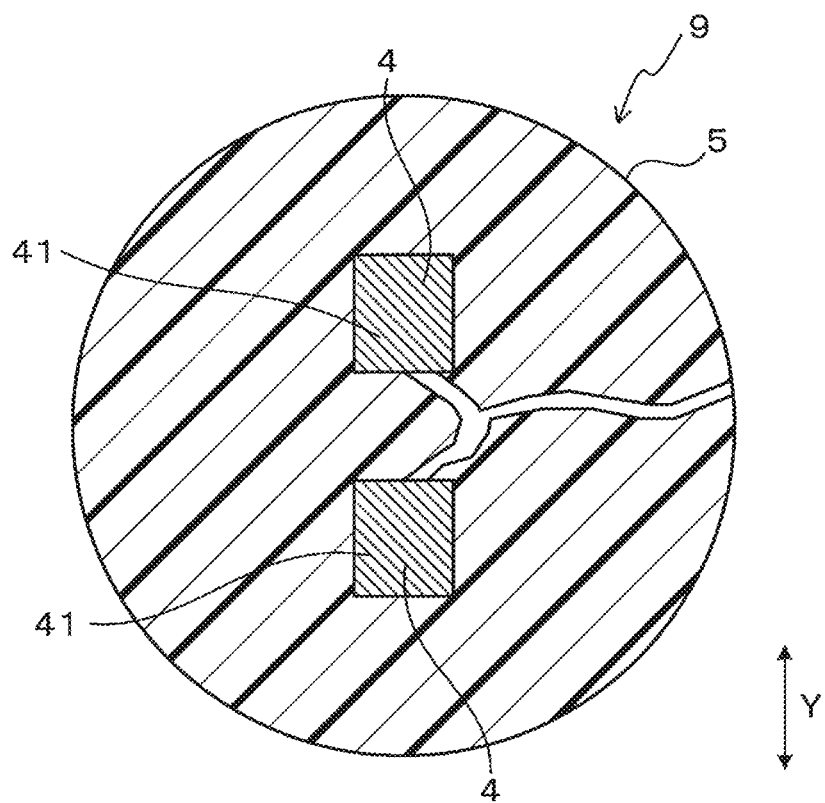
FIG. 6 is a cross-sectional view showing a state where a blister fracture occurs in the housing.

Here, as shown in FIGS. 5, a temperature sensor 9, where no gap of the present embodiment is formed, is considered. According to the temperature sensor 9, in the case where hydrogen H is present in the vicinity of the center portion in the housing 5, when the pressure in the hydrogen tank is reduced, hydrogen moves in the housing for a relatively long distance equivalent to substantially the same as the radius r of the housing 5, whereby the hydrogen is eventually discharged outside the housing 5. Further, in the case where the hydrogen H moves in the housing 5, since the polymer chain of the resin disturbs the movement of the hydrogen H, the time for the movement becomes longer. Accordingly, hydrogen in the housing 5 is not completely discharged from the housing 5 when the pressure in the hydrogen tank is reduced, and expands in the housing 5, which may cause a blister fracture in the housing 5 as shown in FIG. 6.

Figure 4:
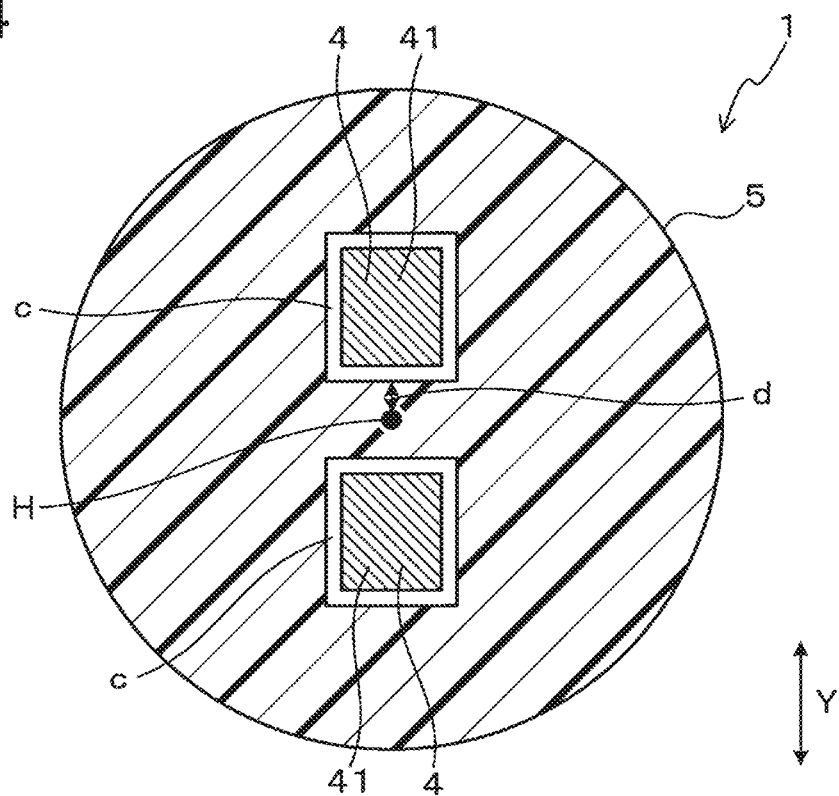
FIG. 4 is a cross-sectional view showing a distance from hydrogen that has entered a center portion of the housing to outside the housing according to the first embodiment.

Next, as shown in FIG. 4, a case is considered in which the gap c is formed between the inner peripheral surface of the though hole 51 of the housing 5 and the conduction member 4 similar to the present embodiment. In this case, when the hydrogen H is present in the vicinity of the center portion of the housing 5 and the pressure in the hydrogen tank is reduced, the hydrogen H moves for a short distance d to the gap c, thereby being discharged outside the housing (here, gap c). Further, when the hydrogen H moves in the gap c, since there is no obstacle that disturbs the movement of the hydrogen H, time required for the movement becomes shorter. Therefore, the hydrogen H in the housing 5 is likely to be discharged from the housing 5 when the pressure in the hydrogen tank is reduced, whereby occurrence of blister fracture can be suppressed.

Here, generally, when performing an insert molding for the housing 5 made of resin which supports the conduction member 4, in order to secure an air tightness between the conduction member 4 and the housing 5, insert molding is performed to remove the gap therebetween. For example, a coupling treatment is performed for the surface of the metal material, thereby removing the gap between the metal material and the resin material, or as disclosed in JP-A-2018-126960, a convexity such as embossing may be formed on the surface of the metal material, thereby closing the gap between the metal material and the resin member. On the other hand, conversely, according to the present embodiment, the gap c is intentionally formed between the housing 5 and the conduction member 4 so as to prevent the blister fracture of the housing 5 from occurring and the electrical reliability from being lowered due to the blister fracture of the housing 5.

Further, in a portion between at least one conduction member 4 and the inner peripheral surface of the through hole 51 in which the conduction member 4 is provided, the gap c is provided which is continuously formed through a length corresponding to a half of the entire length of the through hole 51. Thus, the gap c is continuously formed such that the length thereof is longer than a predetermined length, whereby hydrogen dissolved in the housing 5 is likely to be discharged to the gap c, that is, outside the housing 5 when the pressure in the hydrogen tank is reduced. Accordingly, occurrence of blister fracture can be further suppressed.

Also, in a portion between at least one conduction member 4 and the inner peripheral surface of the through hole 51 in which the conduction member 4 is provided, the gap c is provided which is continuously formed from at least one end of the through hole 51. Hence, hydrogen, discharged from the gap c when the pressure in the hydrogen tank is reduced, is discharged outside the temperature sensor 1 from an edge of the gap c. Accordingly, a pressure difference can be prevented from occurring between the gap c formed between the inner peripheral surface of the through 51 of the housing 5 and the conduction member 4, and the hydrogen tank.

The gap c has a portion of which the dimension in a direction orthogonal to the surface of the conduction member 4 is larger than or equal to 100 nm. The gap c is formed having sufficiently large size compared to the diameter of a hydrogen atom which is 0.3 nm to allow hydrogen to easily move in the gap c.

Moreover, a surface roughness Rz of the surface of a portion of the conduction member 4 which is provided in the housing 5 is 30 μm or less. Hence, it is avoided that the surface of the conduction member 4 and the housing are adhered to each other and the gap is not formed therebetween.

The housing 5 contains polyamide resin or a resin containing polyphenylene sulfide resin. These materials have characteristics in which the solubility of hydrogen in the hydrogen tank is low even when the pressure in the hydrogen tank becomes high. Accordingly, the amount of hydrogen entering in the housing can be reduced, thus preventing a blister fracture from occurring in the housing.

As described above, according to the present embodiment, a temperature sensor capable of suppressing occurrence of blister fracture in the housing can be provided.

Second Embodiment

Figure 7:
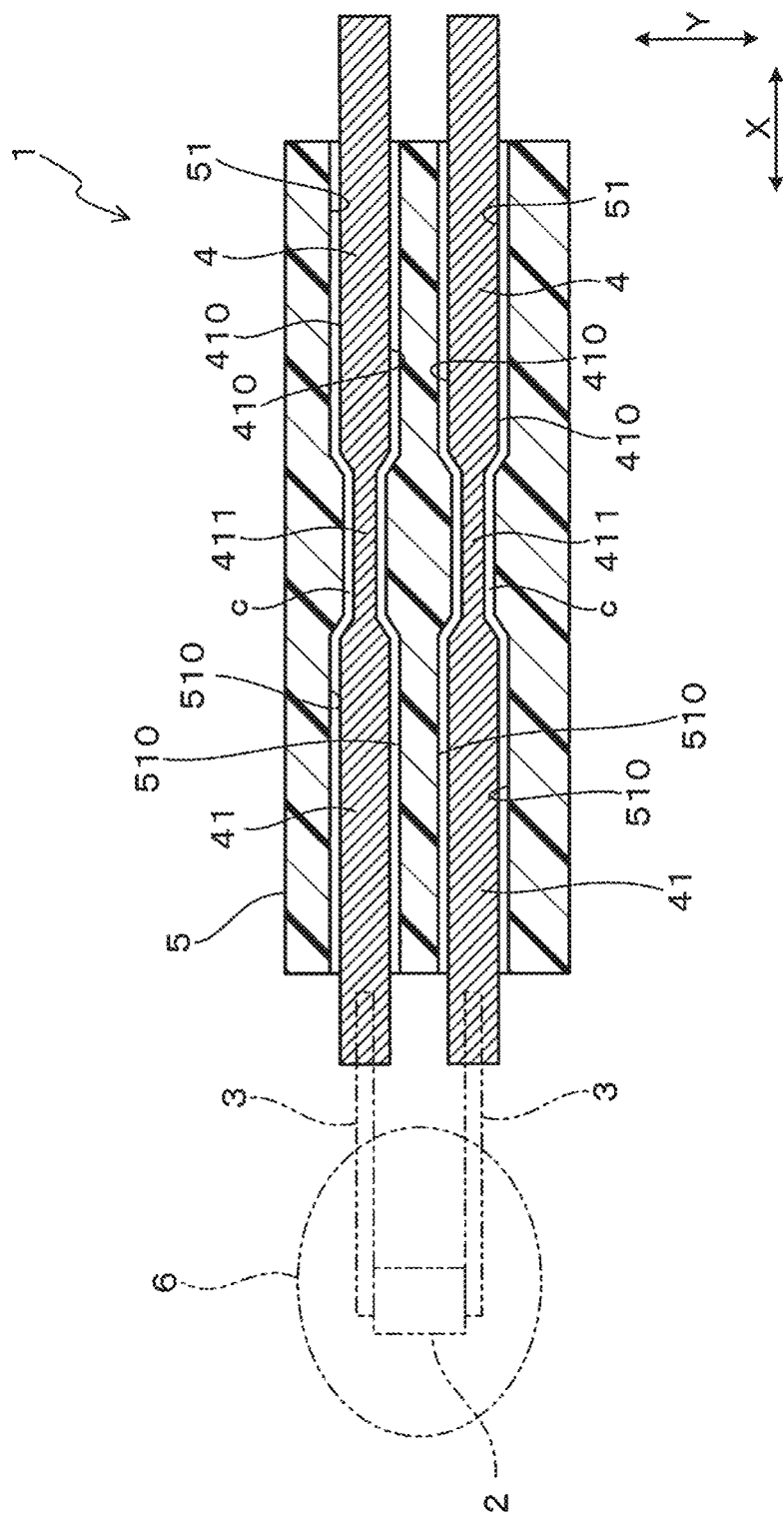
FIG. 7 is a cross-sectional view of a temperature sensor according to a second embodiment.

According to the present embodiment, as shown in FIG. 7, the shape of the conduction member 4 is modified from the first embodiment.

In the present embodiment, a center portion 411 of the in-hole conduction portion 41 in each conduction member 4, which is present at a center thereof with respect to the X direction, is formed such that the width in the Y direction is narrower than that of an adjacent portion of the in-hole conduction portion 41 with respect to the X direction. Thus, as shown in FIG. 7, for the surface 410 of the in-hole conduction portion 41, a shape on a cross-section sectioned along a line parallel to the X direction (hereinafter sometimes referred to as parallel cross-section) is a curved shape. Specifically, the shape on the parallel cross-section of the surface 410 of the in-hole conduction portion 41 in each conduction member 4 has a curved shape such as a bend shape or an arc shape instead of a linear shape. Here, the curved shape does not include the shape of micro roughness like scratches formed on the surface of the conduction member 4, that is, the curved shape refers to a shape of a curve when macroscopically viewing it. Although numerous cross-sections sectioned along lines parallel to the X direction are present, at least one cross-section among these cross-sections may be formed such that the surface 410 of the in-hole conduction portion 41 is formed in a curved shape.

Then, according to the present embodiment, also the housing 5 is molded by insert molding as same as the first embodiment. The housing 5 is formed along the surface 410 of the in-hole conduction portion 41 of the conduction member 4. As a result, for the inner peripheral surface 510 of the through hole 51, a shape on the parallel cross-section has a curved shape along the surface 410 of the in-hole conduction portion 41.

Other configurations are the same as those in the first embodiment. Note that, among the reference symbols used after the present embodiment, reference symbols the same as those in the existing embodiments represent the same constituents in the existing embodiments unless otherwise specified.

According to the present embodiment, the surface 410 of the in-hole conduction portion 41 has a curved shape on the parallel cross-section. Further, the inner surface 510 of the through hole 51 in the housing 5 has a curved shape on the parallel cross-section which is curved along the surface 410 of the in-hole conduction portion 41. Hence, the in-hole conduction portion 41 of the conduction member 4 engages with the housing 5 and thus the conduction member 4 can be prevented from becoming detached from the housing 5. Other than this, similar effects and advantages to the first embodiment can be obtained.

Figure 8:
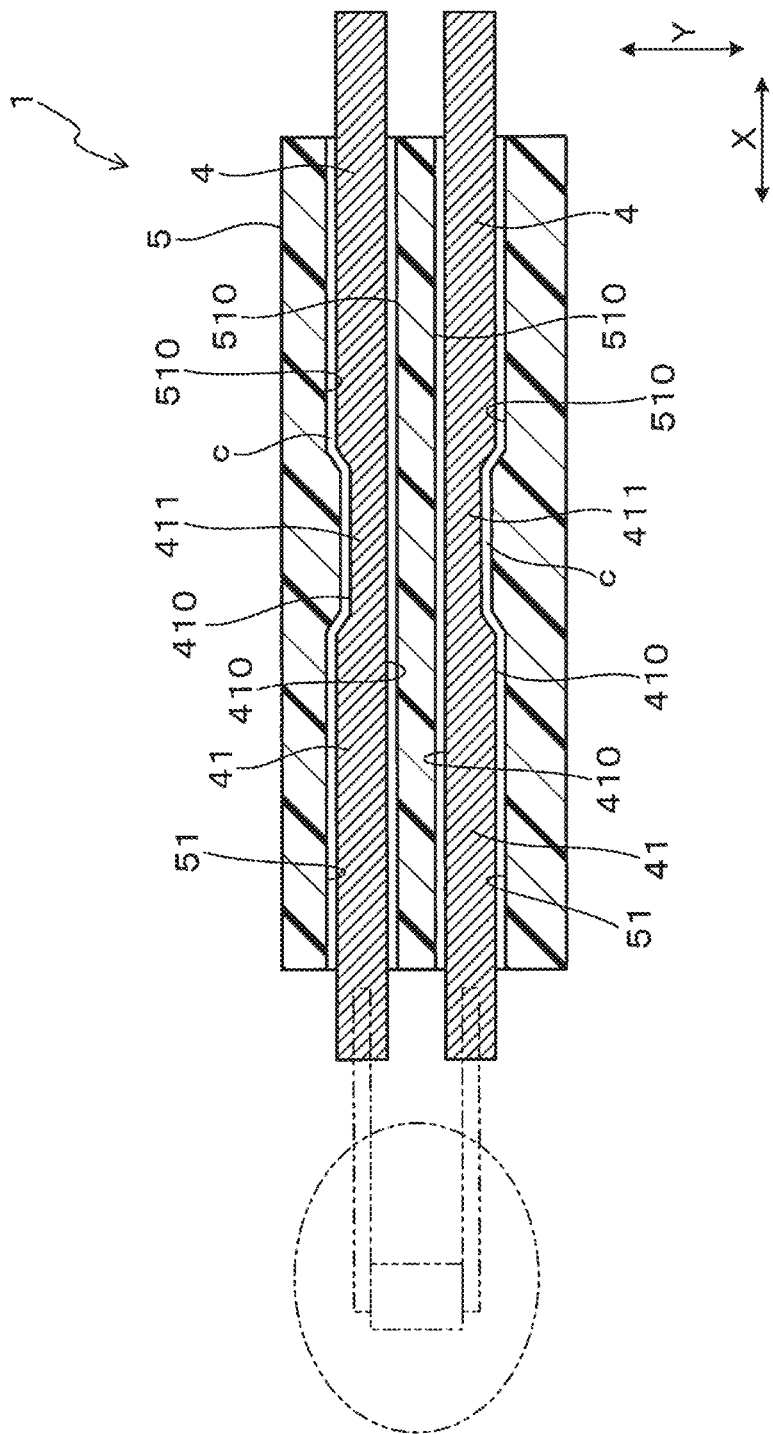
FIG. 8 is a cross-sectional view of a temperature sensor according to a modification of the second embodiment.

According to the present embodiment, for example, a shape exemplified in FIG. 8 may be employed. In the configuration shown in FIG. 8, among surfaces 410 of respective in-hole conduction portion 41, only the surface 410 positioned in the farther side from the other in-hole conduction portion 41 with respect to the Y direction has a curved shape on the parallel cross section, and the inner peripheral surface 511 of the through hole 51 in the housing 5 has a curved shape along the surface 410 of the in-hole conduction portion 41.

Figure 9:
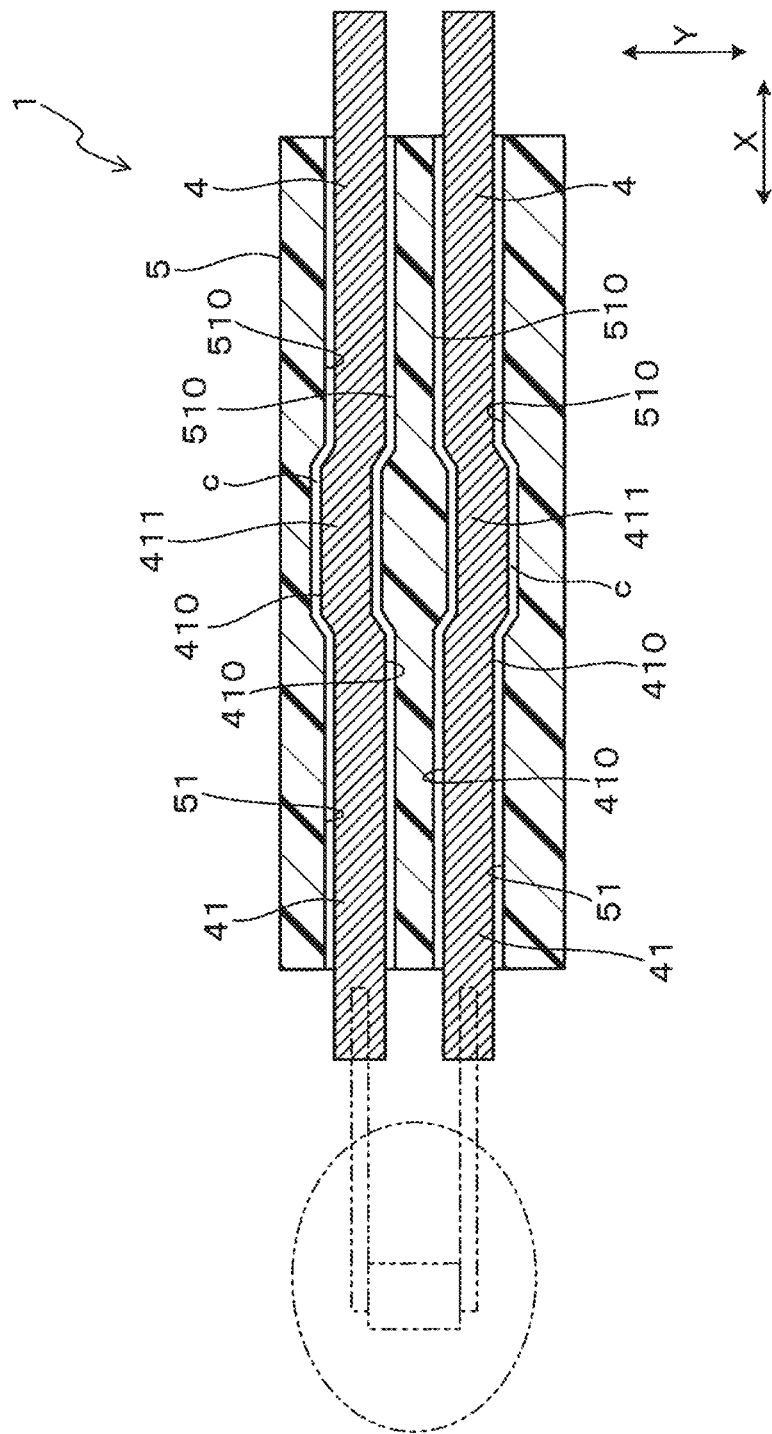
FIG. 9 is a cross-sectional view of a temperature sensor according to another modification of the second embodiment.

Further, in the present embodiment, for example, a configuration exemplified in FIG. 9 can be employed. FIG. 9 exemplifies a configuration in which the in-hole conduction portion 41 is formed in a crank shape, whereby the shape of the surface 410 of the in-hole conduction portion 41 on the parallel cross-section is formed in a curved shape. According to the present embodiment, the center portion 411 of each in-hole conduction portion 41 is formed in a crank shape being cranked in an opposite side of the other in-hole conduction portion 41 with respect to the Y direction. The inner peripheral surface 511 of the through hole 51 in the housing 5 has a curved shape along the surface 410 of the in-hole conduction portion 41.

Although, illustration is omitted, for example, the in-hole conduction portion 41 may include a portion protruding in a direction orthogonal to both the X direction and Y direction or a recessed portion, and the inner peripheral surface 511 of the through hole 51 in the housing 5 may have a shape which is curved along the surface 410 of the in-hole conduction portion 41.

Third Embodiment

According to the present embodiment, the basic configuration is similar to that of the first embodiment and the material of the housing 5 is changed.

In the present embodiment, the housing 5 contains numerous inorganic fibers in the resin. The content of the inorganic fiber in the housing 5 ranges from 10 wt % to 40 wt %. According to the present embodiment, the housing 5 can be configured of a material containing 33 wt % of glass fiber as an inorganic fiber in a polyamide resin such as PA66. Also, for the housing 5, the average length of numerous inorganic fibers ranges from 30 μm to 250 μm. Other configurations are the same as those in the first embodiment.

Next, effects and advantages of the present embodiment will be described. According to the present embodiment, the content of the inorganic fiber in the housing 5 ranges from 10 wt % to 40 wt %. Thus, since the content of the inorganic fiber in the housing is set to be 10 wt % or larger, even when air bubbles or a crack is produced due to a blister fracture, the crack is likely to reach the inorganic fiber, whereby cracks are prevented from propagating to the surface of the housing 5, thereby avoiding the occurrence of large open cracks. Note that the effects of setting the content of the inorganic fiber in the housing 5 to be 10 wt % or more are supported by an experimental example which will be described later. The content of the inorganic fiber in the housing 5 is less than or equal to 40 wt %. Thus, productivity of the housing 5 can be improved. On the other hand, it is difficult to produce a housing 5 in which content of the inorganic fiber exceeds 40 wt %.

Also, the average length of inorganic fiber in the housing 5 ranges from 30 μm to 250 μm. Thus, the average length of inorganic fiber in the housing 5 is set to be larger than or equal to 30 μm, whereby even when air bubbles or cracks are produced due to blister fracture, the crack is likely to reach the inorganic fiber and unlikely to become large. Note that effects of setting the average length of inorganic fiber in the housing 5 to be larger than or equal to 30 μm are supported by an experimental example which will be described later. Also, the average length of the inorganic fibers in the housing 5 is less than or equal to 250 μm. Thus, the productivity of the housing 5 can be improved. On the other hand, it is difficult to produce a housing 5 in which the average length of the inorganic fiber in the housing 5 exceeds 250 μm. Other than this, similar effects and advantages to the first embodiment can be obtained.

Experimental Example 1

The present example is an evaluation, in the temperature sensor, for tolerance to blister fracture under a condition of changing a ratio between the entire length of the through hole in the housing with respect to the X direction, and the length of the gap between the inner peripheral surface of the through hole in the housing and the conduction member with respect to the X direction.

Figure 10:
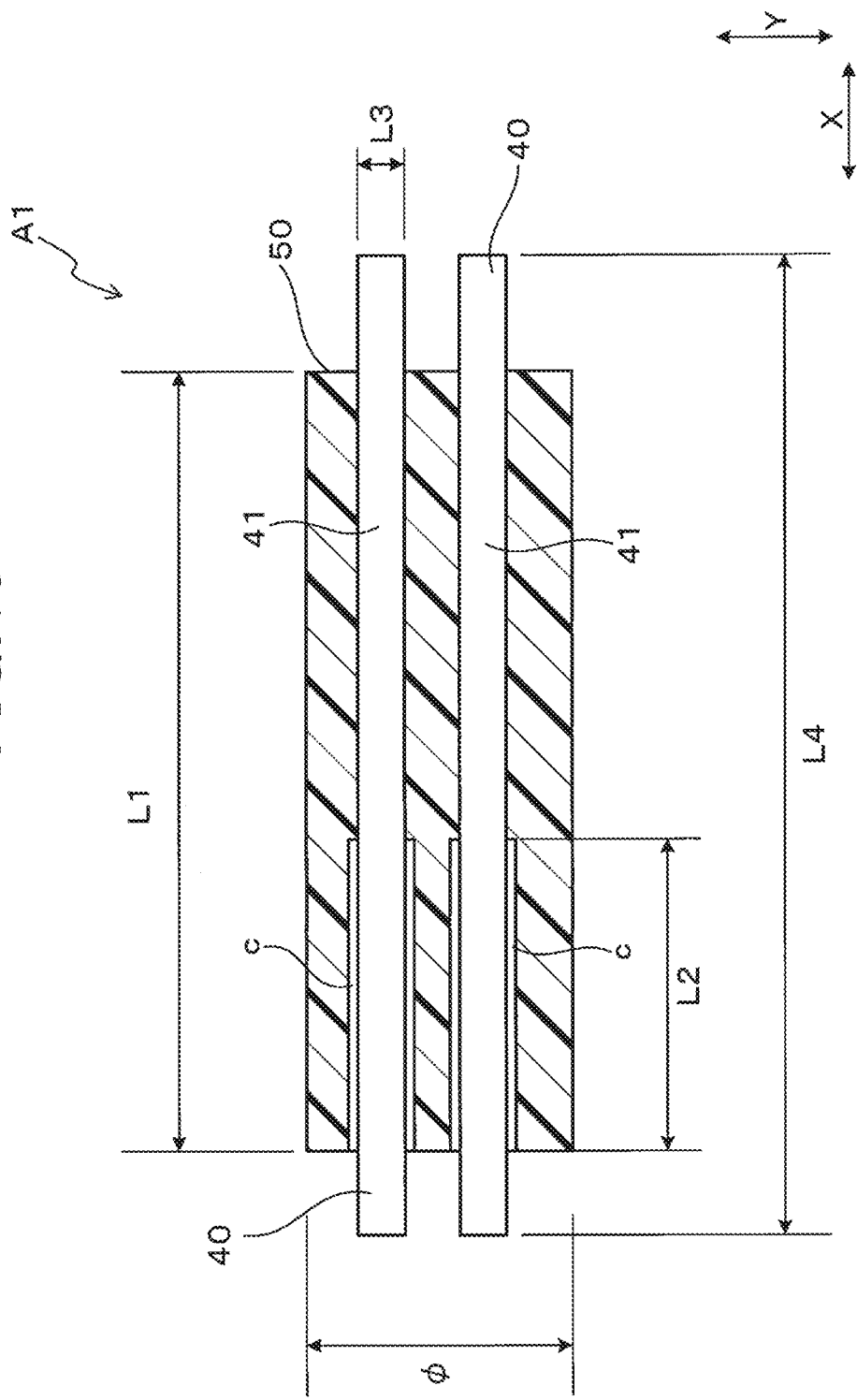
FIG. 10 is a front-view diagram showing a cross-section of a part of a sample A1 according to an experimental example 1.
Figure 11:
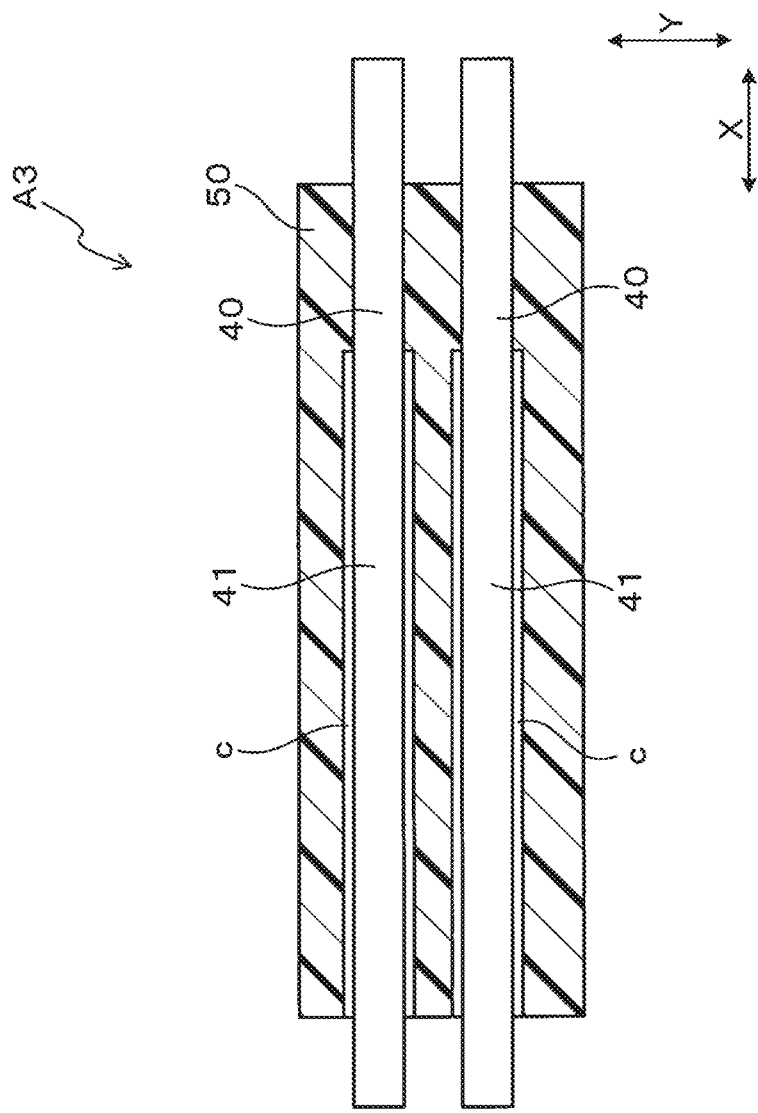
FIG. 11 is a front-view diagram showing a cross-section of a part of a sample A3 according to an experimental example 1.

In the present example, four samples A1 to A4 were prepared as shown in FIGS. 10 and 11 as an example. For each of samples A1 to A4, a pair of metal materials 40 each having a linear shape forming the conduction member 4 were arranged penetrating through a cylindrical body 50 having a cylindrical shape forming the housing 5. According to the present example, the longitudinal direction of the metal material 40 is referred to as the X direction, and a direction orthogonal to the X direction and a direction where the pair of metal materials 40 are arranged is referred to as Y direction. Further, according to the present example, a portion provided inside the cylindrical body 50 in the metal material 40 is referred to as an in-hole conduction portion 41.

For four samples A1 to A4, a ratio L2/L1 (hereinafter referred to as gap forming ratio) between the length L1 of the in-hole conduction portion 41 and the length L2 of the gap c in the X direction between the metal material 40 and the cylindrical body 50 was changed. The gap forming ratio of the sample A1 was 40%, similarly that of the sample A2 was 50%, that of the sample A3 is 80% and that of the sample A4 was 100%. The length of the gap c in the X direction for each of samples A1 to A4 (gap length in table 1), and the length of the in-hole conduction portion 41 in the X direction are shown in table 1 which will be described later. FIG. 10 shows an example of the sample A1 and FIG. 11 shows an example of the sample A4. For the samples A1 to A3, one side of the gap c in the X direction was opened. For the sample A4, both sides of the gap c in the X direction were opened.

According to the present example, the sample A4 can be produced by insert molding which is similar to that of the first embodiment. For the samples A1 to A3, a mold which was appropriately divided in the X direction was utilized. Firstly, the temperature of each mold was set to be higher than normal temperature. Then, resin that constitutes the cylindrical body 50 was filled into the mold where the metal material 40 was disposed, and the pressure was maintained. Thereafter, only a mold in one side in the X direction touching the metal material 40 was positively cooled. Thus, the gap c can be formed at a desired position.

For the dimension of the cylindrical body 50 of each of samples A1 to A4, the length (corresponds to L1 according to the present embodiment) in the X direction is 20 mm, and the diameter φ is 6 mm. The cylindrical body 59 of each of samples A1 to A4 was configured to contain numerous inorganic fibers in the resin similar to that of the housing 5. The cylindrical body 50 of each of samples A1 to A4 was composed of PA66 containing 30 wt % of glass fiber. Then, the average length of the glass fiber in the cylindrical body 50 in each of the samples A1 to A4 was 200 μm.

The metal material 40 of each of the samples A1 to A4 was configured of SUS304. For the metal material 40 of each of samples A1 to A4, the thickness (dimension in a direction orthogonal to both of X direction and Y direction) was set to be 0.6 mm, the width L3 in the Y direction was set to be 1.5 mm and the length L4 in the X direction was set to be 30 mm. Then, the surface roughness Rz of the metal material 40 was set to be 16 μm.

According to the present example, respective samples A1 to A4 were exposed to hydrogen at 85 Mpa for a whole day and night, and then the pressure of the hydrogen atmosphere was reduced to atmospheric pressure from 85 MPa at a reduction speed of 1 MPa/min. These processes were repeated to reach the number of cycles which corresponds to a case where the hydrogen tank was used for 20 years, and it was confirmed whether cracking occurs on the cylindrical body 50 of respective samples A1 to A4. The temperature of the respective samples A1 to A4 before reducing the pressure was set to be 85° C., and a temperature decreased accompanying with the pressure reduction. X-ray CT scanning method was utilized for confirming whether a crack occurs on respective samples A1 to A4.

Then, a tolerance to blister fracture was evaluated for respective samples A1 to A4 after the testing. The results were evaluated as A, B or C as described below. Specifically, an evaluation of A was made in the case where no cracks due to blister fracture were observed on the cylindrical body 50 even when the pressure in the hydrogen tank was repeatedly reduced to reach the number of cycles which corresponds to a case where the hydrogen tank is used for 20 years, and an evaluation of B was made in the case where no cracks were observed due to blister fracture on the cylindrical body 50 even when the pressure in the hydrogen tank was repeatedly reduced to reach the number of cycles which corresponds to a case where the hydrogen tank is used for 15 years, but cracks due to blister fracture were observed on the cylindrical body 50 when the pressure in the hydrogen tank was repeatedly reduced to reach the number of cycles which corresponds to a case where the hydrogen tank is used for 20 years. The evaluation of C was made in the case where cracks due to blister fracture were observed on the cylindrical body 50 when the pressure in the hydrogen tank was repeatedly reduced to reach the number of cycles which corresponds to a case where the hydrogen tank is used for 15 years. The result will be shown in Table 1 as follows.

TABLE 1

| | gap forming ratio [%] | gap length [mm] | length of in-hole conduction portion [mm] | evaluation result |
|---|---|---|---|---|
| sample A1 | 40 | 8 | 20 | C |
| sample A2 | 50 | 10 | 20 | B |
| sample A3 | 80 | 16 | 20 | B |
| sample A4 | 100 | 20 | 20 | A |

As shown in Table 1, the evaluation result was C for the sample A1 having the gap forming ratio 40%. On the other hand, for the samples A2 to A4 whose gap forming ratio is 50% or larger, the evaluation result was A or B in which it is realized that blister fracture is unlikely to occur. That is, it is realized that blister fracture is unlikely to occur when setting the gap forming ratio to be 50% or larger. Further, for the sample A4 whose gap forming ratio is 100%, the evaluation result was A. Hence, in the temperature sensor 1 provided in the hydrogen tank, a gap c is formed such that both sides of the through hole 51 in the housing 5 with respect to X direction are opened, whereby blister fracture can be further prevented from occurring.

Experimental Example 2

The present example is an evaluation, in the temperature sensor, for tolerance to blister fracture when changing the surface roughness Rz of the conduction member is changed.

According to the present example, four samples B1 to B4 were prepared. For each of samples B1 to B3, similar to the experimental example 1, a pair of metal materials 40 each having linear shape forming the conduction member were arranged penetrating through a cylindrical body 50 having a cylindrical shape forming the housing 5. According to the present example, similar to the experimental example 1, the longitudinal direction of the metal material 40 is referred to as the X direction, and a direction orthogonal to the X direction and a direction in which the pair of metal materials 40 are arranged is referred to as the Y direction, and a portion provided inside the cylindrical body 50 in the metal material 40 is referred to as an in-hole conduction portion 41.

The surface roughness Rz of the in-hole conduction portion 41 in the metal material 40 was differentiated between four samples B1 to B4. For the sample B1, the surface roughness Rz of the in-hole conduction portion 41 was 10 µm, for the sample B2, the surface roughness Rz of the in-hole conduction portion 41 was 16 µm, for the sample B3, the surface roughness Rz of the in-hole conduction portion 41 was 30 µm, and for the sample B4, the surface roughness Rz of the in-hole conduction portion 41 was 40 µm.

The material and dimensions of the metal material 40 and the cylindrical body 50 of samples B1 to B4 were the same as those in experimental example 1. Also, the cylindrical body 50 of respective samples was produced by insert molding similar to the first embodiment.

Also in the present example, similar to the experimental example 1, respective samples B1 to B4 were exposed to hydrogen at 85 Mpa for a whole day and night, and then the pressure of the hydrogen atmosphere was reduced to atmospheric pressure from 85 MPa at a rate of 1 MPa/min. These processes are repeated to reach the number of cycles which corresponds to a case where the hydrogen tank is used for 15 years, and it confirmed whether cracks occur on the cylindrical body 50 of respective samples B1 to B4. The temperature of the respective samples B1 to B4 before reducing the pressure was set to be 85° C., and a temperature decreased accompanying with the pressure reduction. X-ray CT scanning method is utilized for confirming whether any cracks occurred in respective samples B1 to B4.

Then, a tolerance to blister fracture was evaluated for respective samples B1 to B4 after testing. The evaluation was B or C which will be described below. Specifically, the evaluation was defined as B in the case where no cracks due to blister fracture are observed on the cylindrical body 50 even when the pressure in the hydrogen tank is repeatedly reduced to reach the number of cycles which corresponds to a case where the hydrogen tank is used for 15 years. The evaluation was defined as C in the case where cracks due to blister fracture are observed on the cylindrical body 50 when the pressure in the hydrogen tank is repeatedly reduced to reach the number of cycles which corresponds to a case where the hydrogen tank is used for 15 years. The result is shown in Table 2 as follows.

TABLE 2

| | Surface roughness Rz [µm] | Evaluation result |
|---|---|---|
| sample B1 | 10 | B |
| sample B2 | 16 | B |
| sample B3 | 30 | B |
| sample B4 | 40 | C |

As shown in Table 2, the evaluation result was B for the samples B1 to B3 having the surface roughness Rz of the in-hole conduction portion 41 being 30 µm or less. That is, blister fracture was unlikely to occur. In other words, the surface roughness Rz of the in-hole conduction portion 41 was set to be 30 µm or less, whereby blister fracture was unlikely to occur. Thus, in the temperature sensor provided in the hydrogen tank, the surface roughness Rz of the in-hole conduction portion of the conduction member provided in the through hole of the housing was set to be 30 µm or less, whereby occurrence of blister fracture can readily be suppressed. On the other hand, the evaluation result was C for the sample B4 in which the surface roughness Rz of the in-hole conduction portion 41 exceeds 30 µm. This is because when the surface roughness Rz of the in-hole conduction portion 41 becomes larger than 30 µm, the cylindrical body 50 enters asperities of the surface of the in-hole conduction portion 41 to improve adhesion between the cylindrical body 50 and the metal material 40, whereby the gap c was unlikely to be formed between the cylindrical body 50 and the metal material 40. On the other hand, as described above, in the temperature sensor provided in the hydrogen tank, the surface roughness Rz of the in-hole conduction portion of the conduction member provided in the through hole in the housing is set to be 30 µm or less, whereby the gap between the in-hole conduction portion of the conduction member and the inner peripheral surface of the through hole of the housing can readily be formed. Hence, occurrence of blister fracture can readily be suppressed.

Experimental Example 3

The present example is an evaluation, in the temperature sensor, for tolerance to blister fracture when changing the content of the inorganic fiber in the housing was changed.

According to the present example, five samples C1 to C5 were prepared. For each of samples C1 to C3, similar to the experimental examples 1 and 2, a pair of metal materials 40 each having linear shape forming the conduction member were arranged penetrating through a cylindrical body 50 having a cylindrical shape forming the housing. According to the present example, similar to experimental examples 1 and 2, the longitudinal direction of the metal material 40 is referred to as the X direction, and a direction orthogonal to the X direction and a direction where the pair of metal materials 40 are arranged is referred to as the Y direction, and a portion provided inside the cylindrical body 50 in the metal material 40 is referred to as an in-hole conduction portion 41.

According to the present example, the cylindrical body 50 of the sample C1 is constituted of PA66 resin containing no inorganic fiber. The cylindrical body 50 of the sample C2 is constituted of a material in which 10 wt % of glass fiber as an inorganic fiber is contained in the PA66 resin. The cylindrical body 50 of the sample C3 is constituted of a material in which 20 wt % of glass fiber as an inorganic fiber is contained in the PA66 resin. The cylindrical body 50 of the sample C4 is constituted of a material in which 30 wt % of glass fiber as an inorganic fiber is contained in the PA66 resin. The cylindrical body 50 of the sample C5 is constituted of a material in which 40 wt % of glass fiber as an inorganic fiber is contained in the PA66 resin. Note that it was difficult to manufacture one containing a glass fiber exceeding 40 wt % in the PA66 resin from a manufacturing point of view In the respective samples C1 to C5, similar to experimental examples 1 and 2, the average length of the glass fiber in the cylindrical body is 200 µm. Note that each dimension of the cylindrical body 50, the material and the dimension of the metal material 40 in other samples C1 to C5 are similar to those of experimental example 1.

The test condition and a method of evaluating a tolerance to blister fracture according to the present example is similar to that of the experimental example 2. The evaluation result is shown in table 3 as follows.

TABLE 3

|  | Content of glass fiber [wt %] | Evaluation result |
| --- | --- | --- |
| sample C1 | 0 | C |
| sample C2 | 10 | B |
| sample C3 | 20 | B |
| sample C4 | 30 | B |
| sample C5 | 40 | B |

In table 3, for the sample C1 containing no glass fiber in the cylindrical body 50, the evaluation result was C meaning that blister fracture was likely to occur. On the other hand, for the samples C2 to C5 containing glass fiber by 10 wt % or larger and 40 wt % or less in the cylindrical body 5, all of samples show the evaluation result B meaning that blister fracture was unlikely to occur.

Thus, in the temperature sensor provided in the hydrogen tank, the content of the inorganic fiber in the housing was set to be 10 wt % or larger and 40 wt % or less, whereby blister fracture can be prevented from occurring.

Experimental Example 4

According to the present example, in the temperature sensor, tolerance to blister fracture was evaluated when changing the average length of the inorganic fiber of the housing.

According to the present example, five samples D1 to D4 were prepared. For respective samples D1 to D4 were, similar to the experimental examples 1 to 3, a pair of metal materials 40 each having linear shape forming the conduction member were arranged penetrating through a cylindrical body 50 having a cylindrical shape assuming the housing 5. According to the present example, similar to the experimental examples 1 and 3, the longitudinal direction of the metal material 40 is referred to as the X direction, and a direction orthogonal to the X direction and a direction where the pair of metal materials 40 are arranged is referred to as the Y direction, and a portion provided inside the cylindrical body 50 in the metal material 40 is referred to as an in-hole conduction portion 41.

According to the present example, 30 wt % of glass fiber as an inorganic fiber was contained in PA66 resin, and samples D1 to D4 were prepared in which the average lengths of glass fiber were differentiated. The average length of the glass fiber in the cylindrical body 50 of the sample D1 was set to be 10 µm, the average length of the glass fiber in the cylindrical body 50 of the sample D2 was set to be 30 µm, the average length of the glass fiber in the cylindrical body 50 of the sample D3 was set to be 100 µm, and the average length of the glass fiber in the cylindrical body 50 of the sample D4 was set to be 250 µm. Note that, it was difficult to manufacture one having an average length of the glass fiber exceeding 250 µm from a manufacturing point of view.

According to the samples D1 to D4, for the cylindrical body 50, 30 wt % of glass fiber was contained in the PA66 resin. Note that each dimension of the cylindrical body 50, the material and the dimension of the metal material 40 in other samples D1 to D5 were similar to those of experimental example 1.

The test condition and a method of evaluating a tolerance to blister fracture according to the present example was similar to that of the experimental example 2. The evaluation result is shown in table 4 as follows.

TABLE 4

|  | Average length of glass fiber [μm] | Evaluation result |
| --- | --- | --- |
| sample D1 | 10 | C |
| sample D2 | 30 | B |
| sample D3 | 100 | B |
| sample D4 | 250 | B |

According to table 4, for the samples D2 to D4 in which the average length of the glass fiber is 30 μm or larger and 250 μm or less, the evaluation result was B, and it is found that blister fracture was unlikely to occur.

Thus, in the temperature sensor provided in the hydrogen tank, the average length of the inorganic fiber in the housing was set to be 30 μm or larger and 250 μm or less, whereby a crack due to blister fracture can be prevented from propagating.

The present disclosure is not limited to the above-described embodiments, but may be applied to various embodiments without departing from the spirit of the disclosure.

Figure 12:
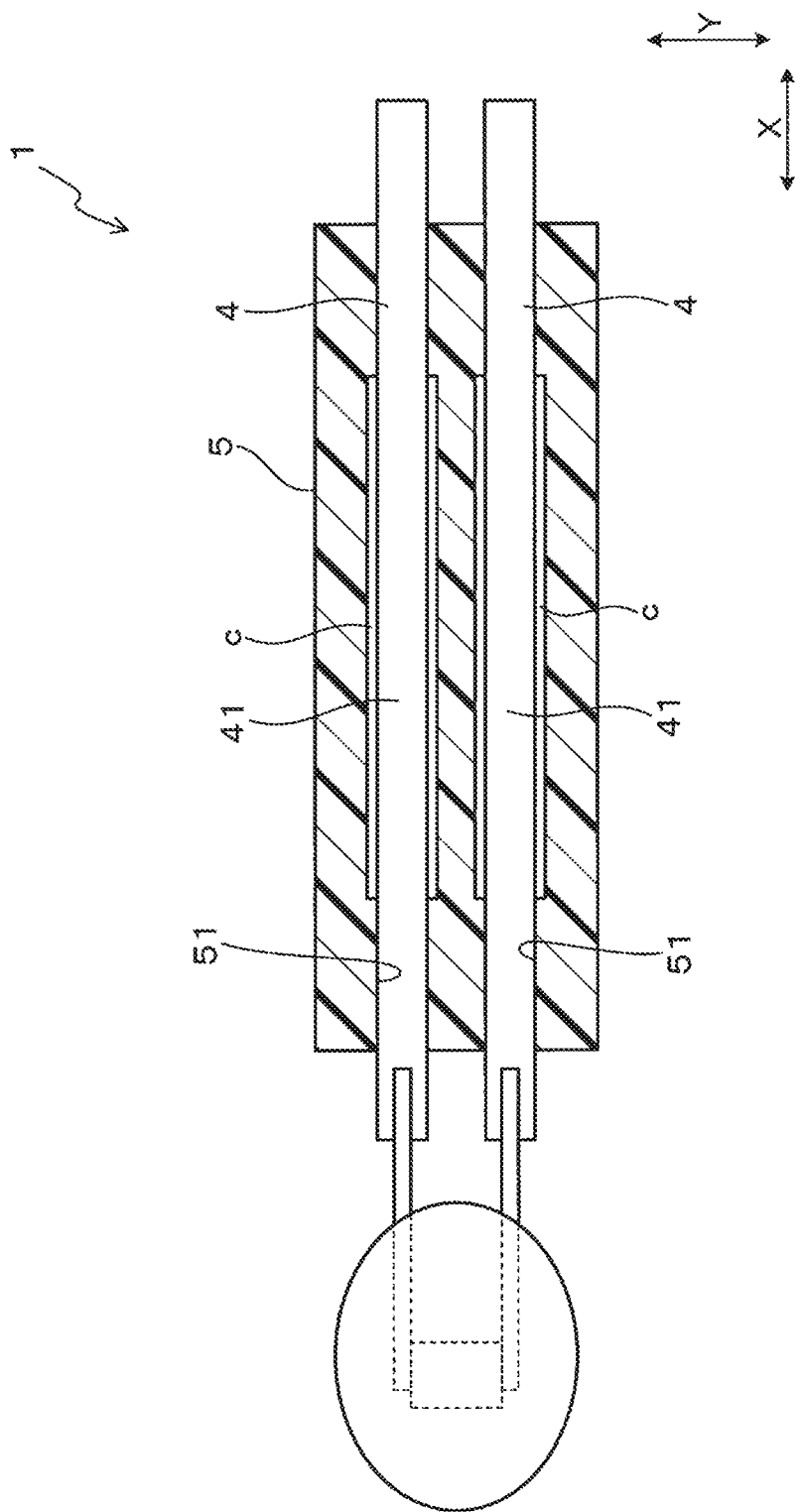
FIG. 12 is a front-view diagram showing a cross-section of a part of a temperature sensor according to an other embodiment (part 1)
Figure 13:
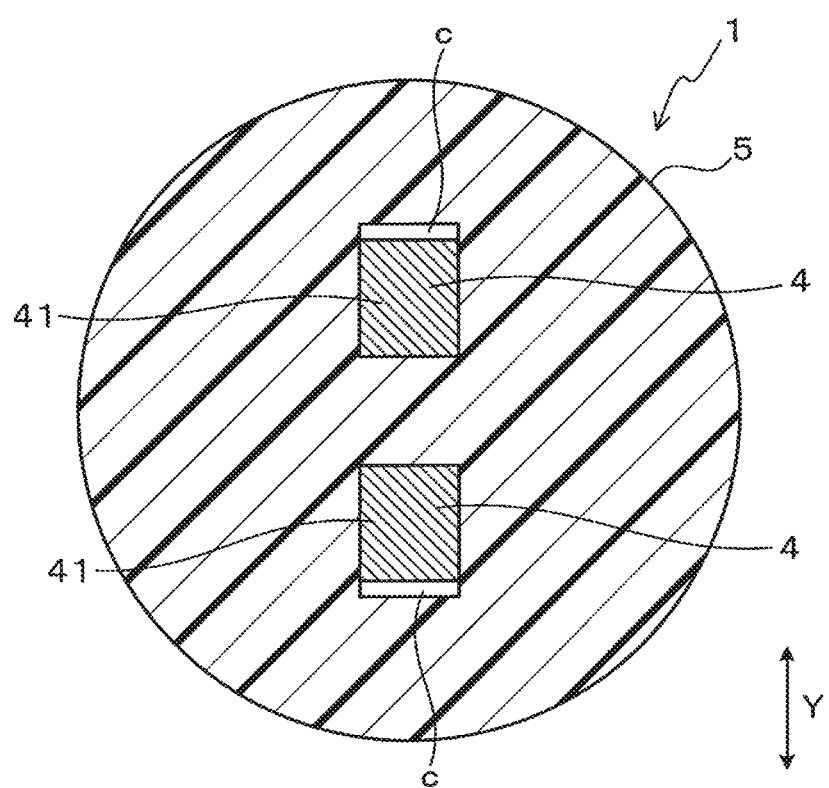
FIG. 13 is a front-view diagram showing a cross-section sectioned along a line orthogonal to a longitudinal direction of the temperature sensor according to the other embodiment (part 2)
Figure 14A:
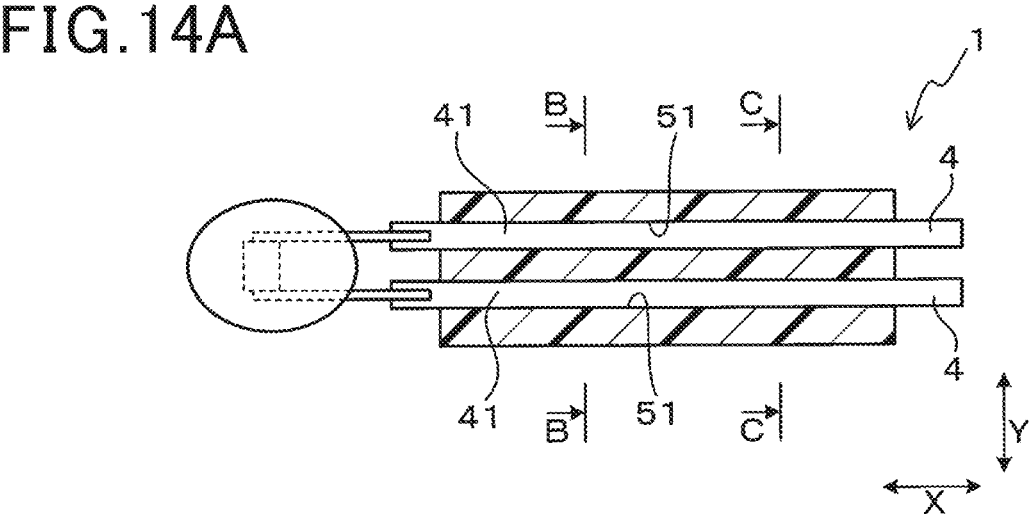
FIG. 14A is a front-view diagram showing a cross-section of a part of a temperature sensor according to the other embodiment (part 3)
Figure 14B:
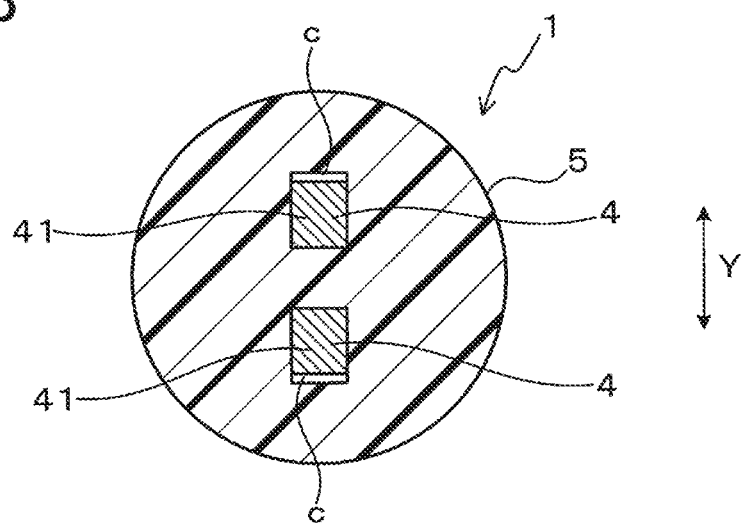
FIG. 14B is a front-view diagram showing a cross-section of the temperature sensor shown in FIG. 14A sectioned along line B-B.
Figure 14C:
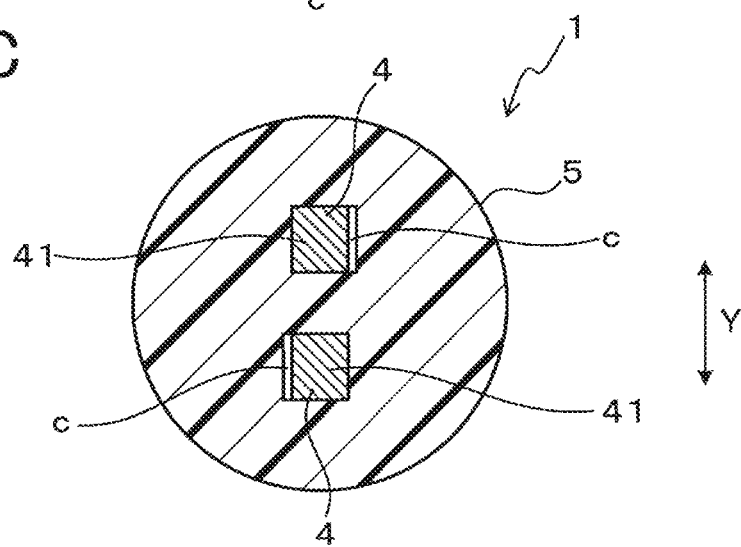
FIG. 14C is a front-view diagram showing a cross-section of the temperature sensor shown in FIG. 14A sectioned along line C-C.

For example, as shown in FIG. 12, the gap c may be formed such that both ends thereof in the X direction are closed. Further, the above-described respective embodiments exemplify a configuration in which the gap c is formed over the entire periphery of the conduction member 4. However, as shown in FIG. 13, the gap c may be formed at a portion in a part of circumferential direction. In this case, as shown in FIGS. 14A to 14C, the gap c may be continuously formed from one end to the other end of the through hole 51 in the X direction while changing the position in the circumferential direction depending on the position with respect to the X direction. Note that illustration of the gap is omitted in FIG. 14A.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

As described, the present disclosure provides a temperature sensor capable of suppressing occurrence of blister fracture in the housing.

One aspect of the present disclosure is a temperature sensor provided in a hydrogen tank including a temperature sensing element that detects a temperature; a pair of element electrode wires electrically connected to the temperature sensing element; a pair of conduction members electrically connected to mutually different element electrode wires; and a housing made of resin, having a pair of through holes in which the pair of conduction members are each inserted therethrough and supported thereby, in which a gap is formed between at least one of conduction members and an inner peripheral surface of the through hole.

In the temperature sensor 1 according to the one aspect, a gap c is formed between at least one conduction member and the inner peripheral surface of the through hole of the housing. Hence, hydrogen, dissolved in the housing when the hydrogen tank where the temperature sensor is disposed is subject to high pressure, is discharged outside the housing through the housing in accompaniment with a pressure reduction in the hydrogen tank. Further, the hydrogen is discharged to the gap through the housing. In the housing, hydrogen moves in the polymer chains of the resin while colliding with the polymer chain. However, hydrogen can move faster in the gap since no substance which disturbs the movement of the hydrogen is present. Hence, hydrogen, dissolved in the housing when the hydrogen tank is highly pressured, is likely to be discharged from inside the housing when the pressure in the hydrogen tank is reduced. Thus, occurrence of blister fracture can be avoided in the housing.

As described, according to the above-described aspect, a temperature sensor capable of suppressing occurrent of blister fracture in the housing can be provided.

What is claimed is:

1. A temperature sensor provided in a hydrogen tank comprising:
   a temperature sensing element that detects a temperature;
   a pair of element electrode wires electrically connected to the temperature sensing element;
   a pair of conduction members electrically connected to mutually different element electrode wires; and
   a housing made of resin, having a pair of through holes in which the pair of conduction members are each inserted therethrough and supported thereby,
   wherein
   a gap is formed between at least one of the conduction members and an inner peripheral surface of the through hole;
   a surface of an in-hole conduction portion of each conduction member provided in the through hole of the housing has a curved shape on a cross-section sectioned along a line parallel to the longitudinal direction of the conduction member; and
   the inner peripheral surface of the through hole of the housing has a curved shape on the cross-section which is curved along the surface of the in-hole conduction portion.

2. The temperature sensor according to claim 1, wherein the gap is provided in a portion between at least one of the conduction members and the inner peripheral surface of the through hole of the housing in which the conduction members are provided, the gap being continuously formed through a length corresponding to a half of an entire length of the through hole in a longitudinal direction.

3. The temperature sensor according to claim 1, wherein the gap is provided in a portion between at least one of conduction members and the inner peripheral surface of the through hole of the housing in which the conduction members are provided, the gap being continuously formed from at least one end of the through hole.

4. The temperature sensor according to claim 1, wherein the gap has a portion where a dimension in a direction orthogonal to a surface of the conduction member is larger than or equal to 100 nm.

5. The temperature sensor according to claim 1, wherein a surface roughness Rz of a surface of a portion of the conduction member provided in the through hole is 30 μm or less.

6. The temperature sensor according to claim 1, wherein the housing contains a polyamide resin or a polyphenylene sulfide resin.

7. The temperature sensor according to claim 1, wherein
the housing is configured of numerous inorganic fibers
contained in the resin; and
a content of the inorganic fibers in the resin ranges 10 wt
% to 40 wt %.

8. The temperature sensor according to claim 1, wherein
the housing is configured of numerous inorganic fibers
contained in the resin; and
an average length of the inorganic fibers in the housing
ranges from 30 μm to 250 μm.

* * * * *